US008639546B2

(12) United States Patent
Bou-Ghannam et al.

(10) Patent No.: US 8,639,546 B2
(45) Date of Patent: Jan. 28, 2014

(54) USING A FORCE-BASED PARADIGM FOR MANAGING OPERATIONAL FULFILLMENT

(75) Inventors: Akram Bou-Ghannam, Lake Worth, FL (US); Michael J. Dockter, Wellington, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/538,520

(22) Filed: Jun. 29, 2012

(65) Prior Publication Data

US 2014/0006087 A1  Jan. 2, 2014

(51) Int. Cl.
*G06Q 40/00*  (2012.01)
(52) U.S. Cl.
USPC ........................................ 705/7.11; 705/7.42
(58) Field of Classification Search
USPC ............................................... 705/7.42, 7.11
See application file for complete search history.

(56) References Cited

U.S. PATENT DOCUMENTS

| 7,668,170 B2* | 2/2010 | Deshpande ................... 370/394 |
| 2009/0055228 A1* | 2/2009 | Henry et al. ...................... 705/7 |
| 2009/0276260 A1* | 11/2009 | Douglas et al. ................... 705/7 |

* cited by examiner

*Primary Examiner* — Thomas Dixon
*Assistant Examiner* — Benjamin S Fields
(74) *Attorney, Agent, or Firm* — Matthew B. Talpis; Gregory K. Goshorn; Greg Goshorn, P.C.

(57) ABSTRACT

Provided are techniques for defining a fulfillment path solution (FPS) comprising items undergoing an operational fulfillment process (OFP); wherein the FPS is associated with milestones to be fulfilled by the items as the items travel the OFP. Each milestone exerts a resistive force on each item. Calculating a plurality of sums, each sum corresponding to a particular item and each sum a total of all resistive forces exerted on the corresponding item by each of the milestones, wherein an item with a deadline closer to the current time is set to a higher resistive force than an item with a deadline farther from the current time; and increasing each resistive force on each item as a corresponding deadline approaches each item; wherein a higher sum indicates a need for more immediate attention.

18 Claims, 6 Drawing Sheets

| FBItemObject | |
|---|---|
| fbIOID: | FBIObjectID |
| date: | DateInfo |
| FPSID: | FPSObjectID |
| rForce: | Array |
| fForce: | Array |
| nForce: | Integer |
| iAttributes: | Array |

- updateItem
    (FBIObject: Array)
- updateForce
    (fID: integer; newForce: integer)
- Integer getResistence
    ()

252, 254, 256, 258, 260, 262, 264, 266, 268, 270, 272, 274, 276

USING A FORCE-BASED PARADIGM FOR MANAGING OPERATIONAL FULFILLMENT

FIELD OF DISCLOSURE

The claimed subject matter relates generally to operation fulfillment and, more specifically, to intuitive and easy to use techniques that facilitate an operational fulfillment process.

SUMMARY

Provided are techniques that facilitate operational fulfillment in a manner that is intuitive and easy to use. Operational fulfillment addresses issues that arise with respect to the delivery, or "provisioning," of resources on time and with a promised measure of quality. In business enterprises, collaboration concerning work activities to enable process fulfillment is common. Process readiness and enablement teams may monitor and manage operations of business activity to make sure any particular business is enabled and fulfilled. Business processes such as, but not limited to, order fulfillment, product announcement, service request fulfillment, and so on typically touch multiple organizations and applications within an enterprise. Milestones and exception alerting may be spread over many internal systems and organizations. Existing technologies like Business Activity Monitoring (BAM), Business Process management (BPM), and Business Event Processing (BEP) collaborate to provide the desired solutions. However, in nearly all deployments of these technologies, extensive tailoring to specific enterprises is required. Due to the high degrees of system integration required for initial deployment, many enterprises use experts that specialize in BAM, BPM, and BEP to implement solutions. This makes these solutions very costly with a long time to value.

Provided are techniques for defining a fulfillment path solution (FPS) comprising a plurality of items undergoing an operational fulfillment process (OFP); wherein the FPS is associated with a plurality of milestones to be fulfilled by the plurality of items as the items travel the OFP; and wherein each milestone of the plurality of milestones exerts a resistive force on each item of the plurality of items; calculating a plurality of sums, each sum corresponding to a particular item and each sum a total of all resistive forces exerted on the corresponding item by each of the milestones; the calculating of each resistive force, comprising: setting an initial resistive force, with respect to each item, based upon a difference between a deadline associated with the milestone and the item, wherein an item with a deadline closer to the current time is set to a higher resistive force than an item with a deadline farther from the current time; and increasing each resistive force on each item as a corresponding deadline approaches each item; wherein a higher sum corresponding to a first item and a lower sum corresponding to a second item indicates a need for more immediate attention to the first item than the second item; and transmitting a notification event based upon the plurality of sums and corresponding items to indicate which items require more immediate attention.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

FIG. 4 is an example of a Force-Based ItemObject that may be employed to implement the claimed subject matter.

DETAILED DESCRIPTION

Figure 1:
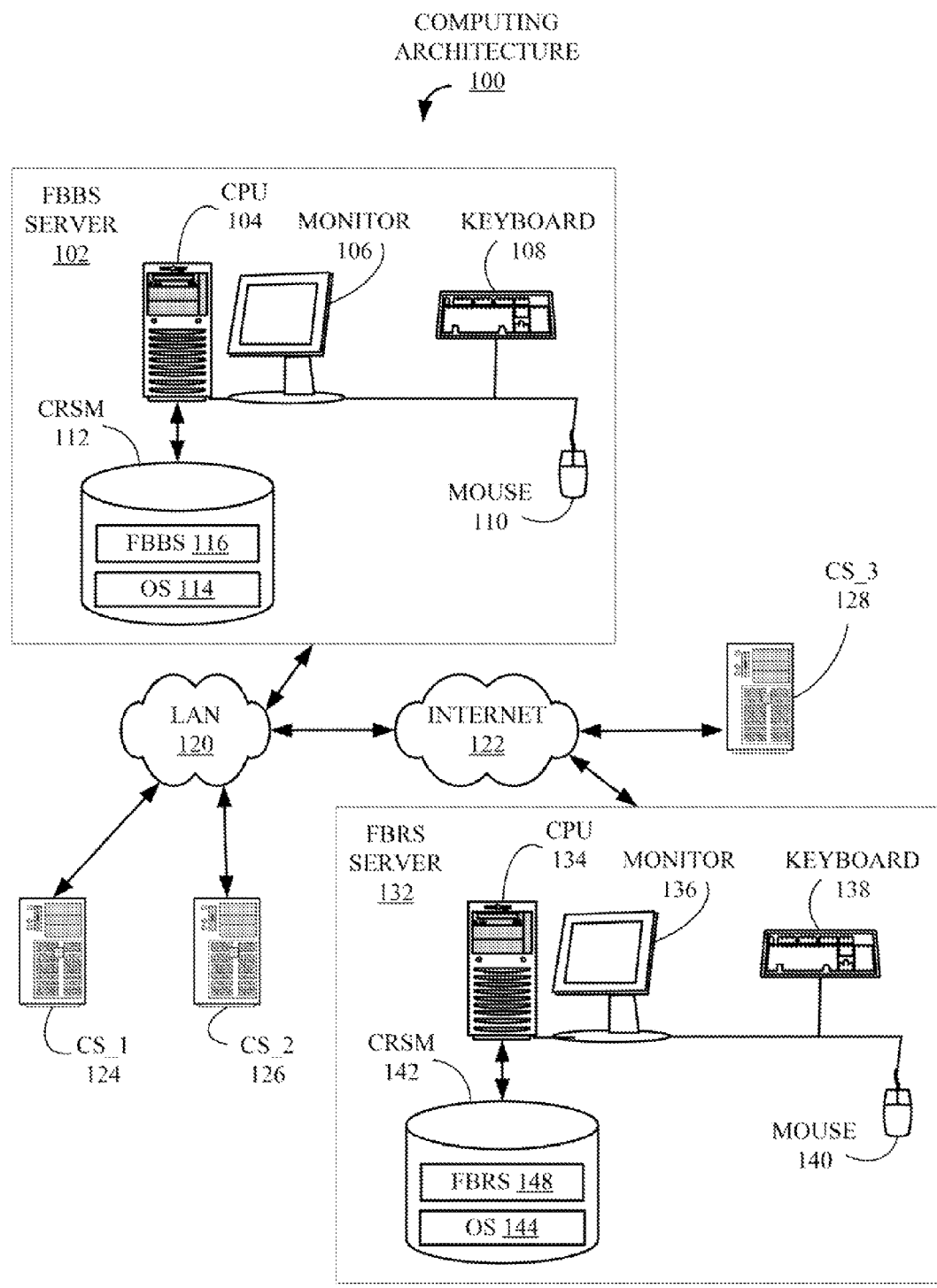
FIG. 1 is a computing architecture that may implement the disclosed techniques.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a Wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, business processes such, but not limited to, order fulfillment, product announcement, service request fulfillment, typically touch multiple organizations and applications within an enterprise, resulting in an arduous and time-consuming task of capturing, managing and reporting an end-to-end view of products and/or services being fulfilled.

Current solutions for the management of operations fulfillment, such as Business Activity Monitoring (BAM), Business Process Management (BPM) and Business EVENT Processing (BEP), are costly, inflexible, complex and may require extensive customization by specialized experts. In other words, with respect to existing technologies, extensive tailoring is required to employ a solution within a specific enterprise. One goal of the disclosed technology is to describe a new paradigm and associated tools that may be employed to simplify operational fulfillment, empowering business users to easily create, customize, deploy and manage operational fulfillment solutions that are intuitive and easy to use.

The herein disclosed new paradigm involves a "force-based" approach in which items undergoing fulfillment each have an affinity towards a fulfillment target and barriers exert a resistive force on the items. A "barrier" is a milestone on a timeline with completion conditions that the item must complete or satisfy in order to advance its fulfillment. Once all milestones (barriers) are fulfilled, the item will be fulfilled. An "item" is an entity undergoing a fulfillment process, including, but not limited, to, parts, products, service requests, and so on. An item is associated with a fulfillment path. A fulfillment path includes milestones, i.e. "barriers," that an item must meet to achieve a fulfillment goal. The disclosed technology includes multiple user-specified fulfillment paths, including but not limited to, order fulfillment, service request fulfillment, new product announcement and so on. An item is assigned to a fulfillment path in conjunction with an announcement event.

Two different types of events are "announcement" events and "status" events. Announcement events notify a force-based runtime system (FBRS) (see 148, FIGS. 1 and 3) that a fulfillment path solution (FPS) is to be initialized (see 250, FIG. 5). In other words, an announcement event presents a goal to be fulfilled and is used to associate items to a specific fulfillment path that correspond to the goal. In addition, an announcement event associates specific items to be fulfilled (managed) to the initialized fulfillment path instance. Status events relay the status of items and are employed by barriers to determine if barriers, or "milestones," have been completed. A milestone comprises, but is not limited to, an event and a deadline for the event to happen. For example, in a product delivery type fulfillment path, a particular product, i.e. "item," must be packaged for mailing, i.e., "event," by a specific date, i.e. "deadline," to meet the goal of the FPS. Status events are also employed to report progress of fulfillment paths.

The disclosed technology employs a force-based paradigm to manage a FPS. In other words, a FPS comprises milestones that exert a force on items in the FPS. As an item approaches the deadline, the force on the item increases. Other factors such as, but not limited to, capacity may also affect the force on a particular item. For example, more force may be exerted on the particular product with respect to the packaging deadline if there are more of a particular item to process.

Turning now to the figures, FIG. 1 is a computing architecture 100 that may implement the disclosed techniques. A force-based build system (FBBS) server 102 includes a central processing unit (CPU) 104, coupled to a monitor 106, a keyboard 108 and a pointing device, or "mouse," 110, which together facilitate human interaction with computing system 100 and FBBS server 102. Also included in FBBS server 102 and attached to CPU 104 is a computer-readable storage medium (CRSM) 112, which may either be incorporated into FBBS server 102 i.e. an internal device, or attached externally to CPU 104 by means of various, commonly available connection devices such as but not limited to, a universal serial bus (USB) port (not shown). CRSM 112 is illustrated storing an operating system (OS) 114 and a FBBS component, or simply FBBS 116. FBBS 116 is described in more detail below in conjunction with FIGS. 2-6.

FBBS server 102 and CPU 104 are connected to a Local Area Network (LAN) 120, which provides connectivity to the Internet 122. Two client systems, i.e. a CS_1 124 and a CS_2

126 are communicatively coupled to LAN 120 and a client system, i.e. CS_3 128 is coupled to Internet 122. Although in this example, FBBS server 102, CS_1 124, CS_2 126 and CS_3 128 are communicatively coupled via one or both LAN 120 and the Internet 122, they could also be coupled through any number of communication mediums such as, but not limited to, a wide area network (WAN) (not shown), direct wire and wireless systems.

Also coupled to the Internet 122 is a force-based runtime system (FBRS) server 132. Like FBBS server 102, FBRS server 132 includes a CPU 134, a monitor 136, a keyboard 138, a mouse 140 and a CRSM 142. CRSM 142 is illustrated storing an OS 144 and a FBRS component, or simply FBRS 148. FBRS 148 is described in more detail below in conjunction with FIGS. 2-6. Further, it should be noted there are many possible computing system configurations, of which computing system 100 is only one simple example. The particular components of FIG. 1 are used as examples throughout the remainder of the Description.

Figure 2:
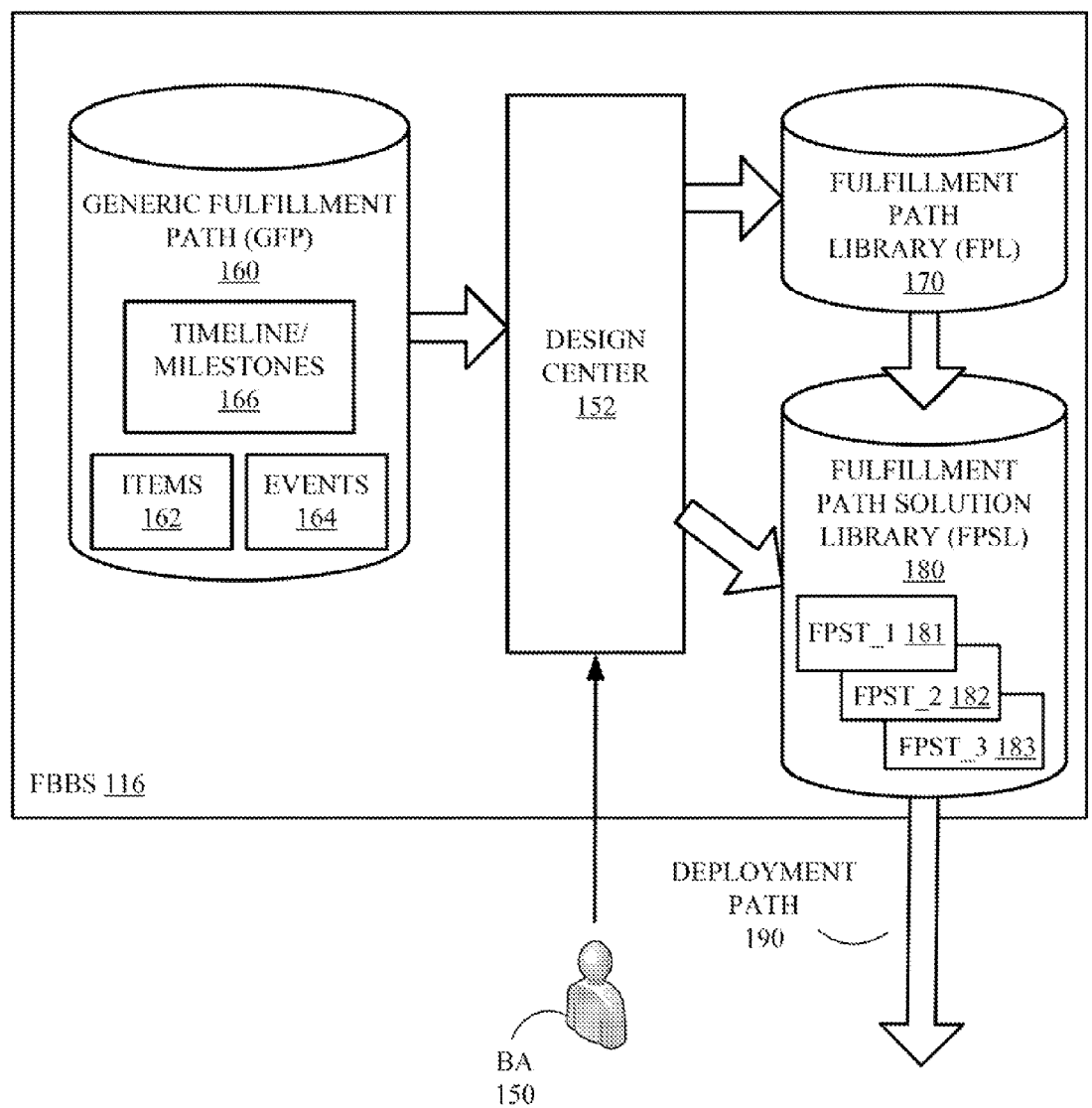
FIG. 2 is an illustration of a Force-Based Build-time Services (FBBS), first introduced in FIG. 1, which may implement aspects of the claimed subject matter.

FIG. 2 is an illustration of FBBS 116, first introduced in FIG. 1, which may implement aspects of the claimed subject matter. In this example, logic associated with FBBS 116 is stored in CRSM 112 (FIG. 1) and executed on one or more processors (not shown) of CPU 104 (FIG. 1) of FBBS server 102 (FIG. 1).

A business administrator (BA) 150 employs a design center 152, which may be implemented as a graphical user interface (GUI) (not shown) on FBBS server 102. Design center 152 enables BA 150 is select previously designed elements stored in a generic fulfillment path database, or "GFP," 160. In this example, defined elements in GFP 160 include items 162, events 164 and timeline/milestones 166. BA 150 may use either defined or customized elements of GFP 160 to produce templates of fulfillment paths (not shown), which are stored in a fulfillment path library (FPL) 170.

By modifying templates stored in FPL 170, BA 148 may generate fulfillment paths that are customized for specific situations. Such customization typically involves the defining of generic elements of items 162, events 164 and timeline/milestones 166. For example, items and events may be given specific names and milestones may be named and assigned specific initial weights. Such customized fulfillment paths are stored in a fulfillment path solution library (FPSL) 180. Once a particular fulfillment path has been customized for a specific situation, a corresponding fulfillment path solution template (FPST) 181-183 is transmitted to FBRS 118 (FIG. 1; see FIG. 3) via a deployment path 190. Deployment path 190 is simply one technique for transmitting FBSTs generated with FBBS 118 to FBRS 148 (FIG. 1) for implementation. For example, BA 150 may select a particular FBST 181-183, select a FBRS server such as FBRS server 132 (FIG. 1) to which to deploy the selected FBS(s) and hit a Deploy button (not shown) on a GUI (not shown) that invokes a web service (not shown) associated with a deployment manager (see 202, FIG. 3) to deploy the selected FBST(s) to the selected FBRS server.

Figure 3:
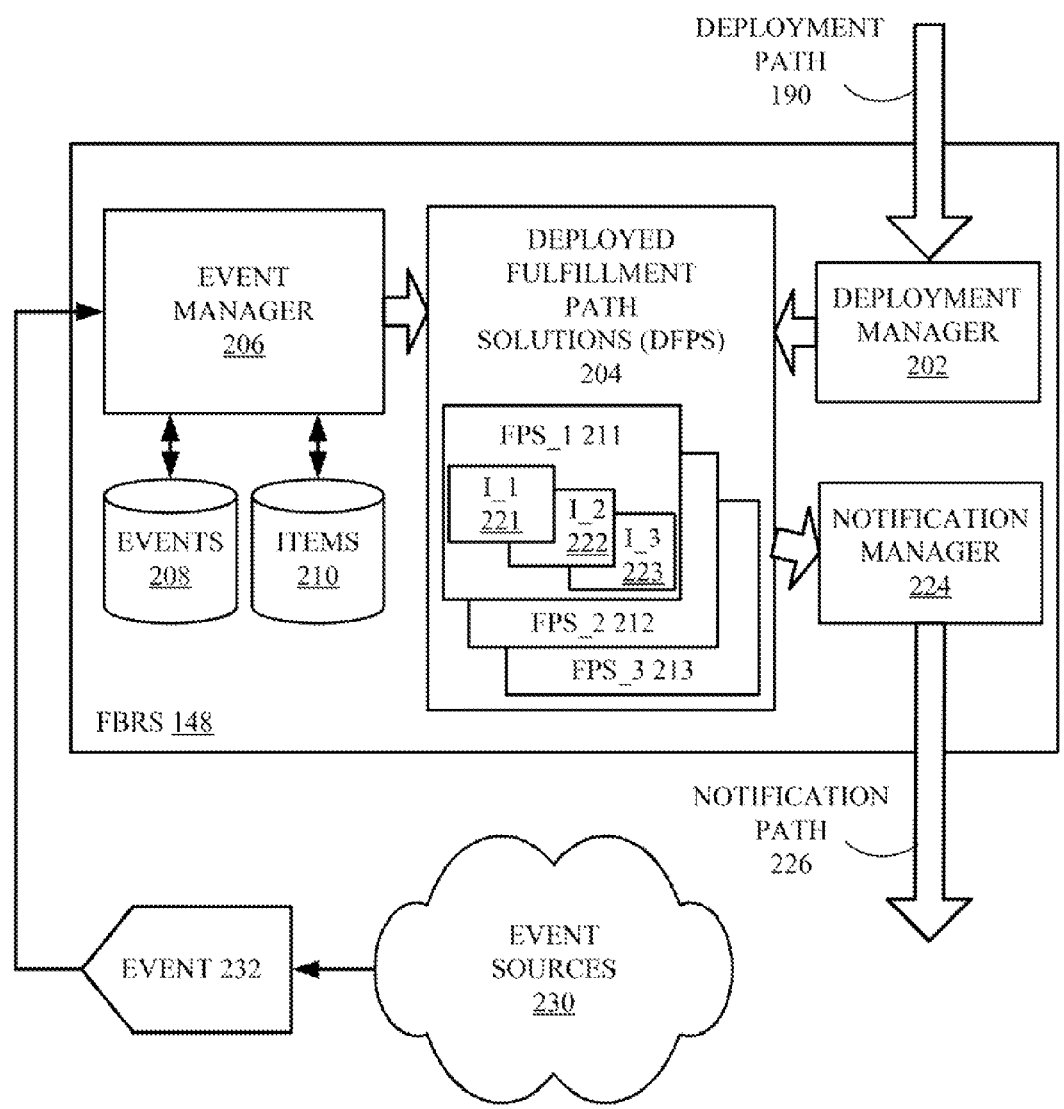
FIG. 3 is an illustration of a Force-Based Runtime System (FBRS), first introduced in FIG. 1, which may implement aspects of the claimed subject matter.

FIG. 3 is an illustration of Force-Based Runtime System (FBRS) 148, first introduced in FIG. 1, which may implement aspects of the claimed subject matter. In this example, logic associated with FBRS 148 is stored in CRSM 142 (FIG. 1) and executed on one or more processors (not shown) of CPU 134 (FIG. 1) of FBRS server 132 (FIG. 1).

As described above in conjunction with FIG. 2, a FPSTs 181-183 is deployed to FBRS 148 via deployment path 190 (FIG. 2) to a deployment manager 202. Deployment manager 202 stores selected deployed instances of FPSTs 181-183 in a deployed fulfillment path solutions (DFPS) library, or simply DFPS 204. In this example, deployed FPSTs are illustrated, i.e. a FPS_1 211, a FPS_2 212 and a FPS_3 213. Each of FPSs 211-213 includes event items. For the sake of simplicity, only items associated with FPS_1 211 are illustrated, i.e. an I_1 221, an I_2 222 and an I_3 213. In should be noted that in a real-world scenario, there may be many more FPSs with many more items but for the sake of simplicity only a few of each are illustrated.

Events within the system managed by the disclosed technology originate from various event sources 230. In the following examples, two (2) types of events are used: "announcement" events and "status" events. As explained in more detail below in conjunction with FIGS. 4-6, an announcement event is employed to select a particular FPST 181-183 and initialize a particular FPS such as FPSs 211-213. In other words, upon receipt of an announcement event, an FPST 181-183 is selected that corresponds to the particular event and a specific FPS instance such as FPS 211-213 is initiated. In other words, FPSTs 181-183 are templates that represent particular types of business processes. When an announcement event is received, the event is correlated to an appropriate template and a specific FPS 211-213 is generated. A status event is employed to update corresponding items 221-223 in FBS 211-213. Some examples of the source of a status event include, but are not limited to, business processes, applications, databases (DBs), people, files and so on. In other words, any event within an organization that might affect a project timeline or milestone is a status event, e.g. completion of a business process or a particular module of an application or project, the addition or attrition or employees, collection of necessary data and a manager's approval of a particular event.

In this example, an event 232 that originated from event source 230, is transmitted to an event manager 206. Event manager 206 stores information concerning event 232 in an events DB 208. Event manager 206 also maintains an item DB 210 and correlates received events such as event 232 to items in item DB 210. Based upon the correlation of received events to particular item (any particular event 232 may impact more than one item), event manager 206 updates FPSs such as FPS 211-213 and corresponding instances 221-223 stored in deployed fulfillment path solutions 204. The updating of FPSs 211-213 and items 221-223 is explained in more detail below in conjunction with FIGS. 4-6. A notification manager 224 is responsible for the transmission, via a Notification Path 226, of reports to administrators of a particular OPF relating to the progress.

FIG. 4 is an example of a Force-Based ItemObject (FBIO) 250 that may be employed to implement the claimed subject matter. FBIO 250 includes a title section 252, which merely states the name of object 250, i.e. "FBItemObject," an attribute section 254, which contains memory elements, or attributes, associated with FBIO memory object 250, and a method section 256, which includes functions, or methods, that may be executed in conjunction with FBIO 250. It should be noted that the attributes and methods described are used for the purpose of illustration only. Additional and/or different attributes and methods may be employed to implement the claimed subject matter.

Attribute section 252 includes an "fbIOID" attribute 258, a "date" attribute 260, an "FBSID" attribute 262, a "rForce" attribute 264, a "fForce" attribute 266, an "nForce" attribute 268 and an "attributes" attribute 270.

FbIOID attribute 258 is a variable of type FBIObjectID that contains a reference to the particular instance of object 250. Each instance of object 250 has a unique value for attribute 258 that allows each instance to be uniquely identified.

Instantiations of object 250 are stored in CRSM 112 (FIG. 1) in conjunction with both FBSBS 116 (FIGS. 1 and 2) and FBSRS 118 (FIGS. 1 and 3). Date attribute 260 is a variable of type DateInfor that stores a reference to a particular time and date that the corresponding instantiation object 250 was last updated. FPSID attribute 262 is a variable of type FPSObjectID that stores a record identifying a specific FPS such as FSBs 211-213 that may be affected by an update to any particular instantiation of object 250. It should be understood that a particular event may affect multiple FPSs. In that case attribute 262 may be implemented as an array of attributes of type FPSObjectID.

rForce attribute 264 is a variable of type array, or list, that stores he various resistive forces associated with the particular instantiation of FBIO 250. Specific forces stored in attribute 264 would typically be of type Float or Integer. Typically, the total resistive forces are exerted on the item by barriers and may be comprised of multiple components, each stored as an element of array 264 such as, but not limited to, a deadline-based force component, a capacity-based, or workload, force component, quality-based force components and so on.

The following equation is one example of an algorithm that may be employed to calculate a deadline-based force component of rForce 264:

If a milestone is not yet completed, then
Deadline Resistive force=$K1/(T-t)$ when $T>t$;
Deadline Resistive Force=MaxF when $t=T$; and
Deadline Resistive force=MaxF $K2(t-T)$ when $t>T$.;
where:
t is the current date/time timestamp;
T is the date/time timestamp of the corresponding milestone;
K1 and K2 are user-specified and configurable constants; and
MaxF is a configurable constant representing the maximum value or the resistive force when $t=T$.

In the event that a corresponding milestone has been completed, the Deadline Resistive force would typically=0.

A capacity-based force component may be calculated based upon factors such as workload capacity, For example, assume a team that completes a certain milestone can typically complete one hundred (100) items per day on average. The capacity-based component of rForce 264 will then increase proportionally to the number of items associated with the milestone.

In addition, an element of item priority may enter these equations. For example, the resistive force on an item may be proportional to the priority of the item such as, Deadline Resistive force=$P*(K1/(T-t))$ when $T>t$ and so on, where P a priority value assigned to the item. In such a case, an item's priority can be thought of as a weight such that a heavier weight produces a larger resistive reaction when it collides with other objects. Further, items associated with larger resistive forces would require more immediate attention than items with less as a larger resistance indicates that an item may be approaching or has missed a deadline.

fForce attribute 266 is a variable of type Array, or list, that stores the various affinity-based forces associated with a particular instantiation of FBItemObject 250. An affinity-based force measures the corresponding item's affinity towards fulfillment such as the importance that the item achieves a target on time. For example, an item with a large fForce 266 may encounter higher resistive forces from a barrier to highlight the importance and a need for attention if the barrier is not removed on time.

nForce attribute 268 represents a net force, or combination of rForce 266 and fForce 268. As such, nForce 268 may also simply be calculated from rForce 266 and fForce 268 when needed. iAttributes 270 is a variable of type Array that stores attribute-value pairs that represent the item. Examples include, but are not limited to, name, description, part number and so on.

Method section 256 of object 250 includes two exemplary functions, or methods. Only three methods are illustrated for the sake of simplicity. Those with skill in the programming arts should appreciate that an object such as object 250 would typically include many additional methods including, but not limited to, constructors, destructors, and methods to set and get values for various attributes.

An "updateItem" method 272 is called to update the values stored in one or more instances of a FBItermObject 250. In this example, method 272 is called with one parameter: "FBIobject," a variable of type Array that stores the FBIobjects 250, identified by the value stored in the corresponding fbIOID 258 and including any new values for attributes 260, 262, 264, 266, 268 and 270. An updateForce method 274 is called to update the values of rForce 264, fForce 266 and nForce 268. Method 274 is called with two parameters a fID parameter of type Integer that is used to identified the specific attribute 264, 266 or 268 to be updated and a newForce attribute of type integer that stored the new value of the attribute 264, 266 or 268 to be updated. In addition, method 274 performs calculations to update forces other than the identified force based upon the update. For example, an update to either rForce 264 or fForce 266 would necessitate an update to nForce 268.

A "getResistance" method 276 is called to get a current value for the resistance on the corresponding FBItemObect 250. Method 276 is called without parameters and returns an Integer that represents the current resistance. The current resistance is calculated based upon the force values 264, 266 and 268 and parameters that determine the relative value different forces are given with respect to each other.

It should be understood that FBIO object 250 is only one example of a memory object that may be used to implement the claimed subject matter. Other memory objects with fewer, more and/or different attributes and methods may be employed. In addition, there are many ways other than employing object 250 to implement the functionality and data storage of the claimed subject matter. For example, the claimed subject matter may be implemented by means of a computer program in conjunction with a relational database.

Figure 5:
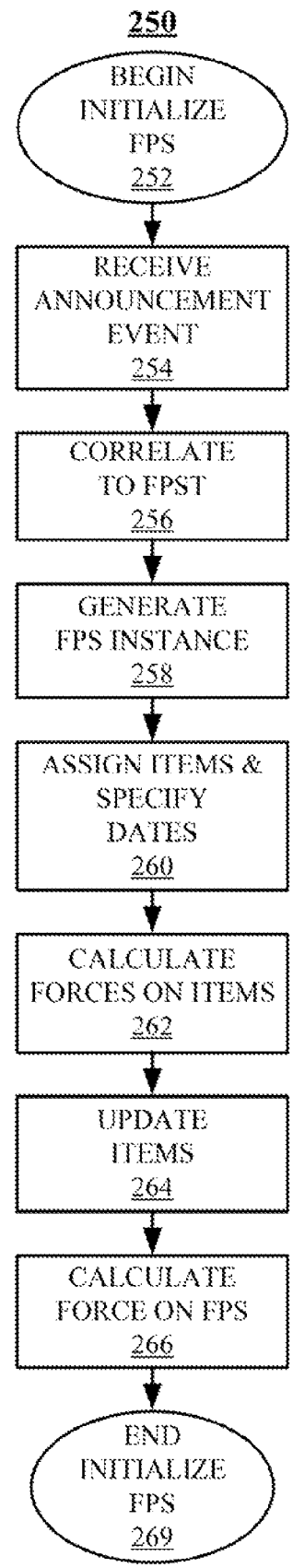
FIG. 5 is a flowchart of an Initialize Fulfillment Path Solution (FPS) process that may implement aspects of the claimed subject matter.

FIG. 5 is a flowchart of an Initialize FPS process 250 that may implement aspects of the claimed subject matter. In this example, logic associated with process 250 is stored on CRSM 142 (FIG. 1) and executed on one or more processors (not shown) of CPU 134 (FIG. 1) of FBRS server 132 (FIG. 1) in conjunction with FBRS 148 (FIGS. 1 and 3).

Process 250 starts in a "Begin Initialize FPS" block 252 and proceeds immediately to a "Receive Announcement Event" block 254. During processing associated with block 254, an announce event is received at event manager 206 (FIG. 3) of FBRS 148. As explained, an announcement event presents a goal to be fulfilled and is used to associate items to a specific fulfillment path that correspond to the goal. During processing associated with a "Correlate to FPST" block 256, a specific FPST that corresponds to the goal declared in the announcement event received during processing associated with block 254 is selected from the possible FPST(s). As explained above in conjunction with FIG. 2, BA 150 defines various templates for FPSs that are stored in FPSL 180 and deployed via deployment path 190. The announcement event received during processing associated with block 254 is parsed to determine the particular type of FPS, defined by BA 150 employing FBBS 116 (FIGS. 1 and 2), that is appropriate. Different types of FPSTs may include, but are not limited to, FPST specifically designed to represent order fulfillment, product announcement and service request fulfillment scenarios.

During processing associated with a "Generate FPS Instance" block 258, a specific instantiation of an FPS is generated using the FPST selected during processing associated with block 254. The selection is made based upon information included with the announcement event. In the following example, FPS 211 is used for illustrative purposes. During processing associated with an "Assign Items & Specify Dates" block 260, specific items and corresponding deadlines are assigned to FPS 211. In addition, a fulfillment target date is assigned to FPS 211. This fulfillment target date, which is specified in the announcement event, makes FPS 211 unique. In this example, the assigned items, which are also specified in the announcement event, are I_1 221, I_2 222 and I_3 223. For example, if FPS 211 is an order fulfillment scenario, I_1 221 may represent that the product is ready for shipment, I_2 222 may represent the order has been packaged for shipment and I_3 223 may represent the package has been delivered to a delivery service. It should be noted that often deadlines are calculated in a reverse order from the necessary deadline for completion of each item 221-223. For example, if a date has been specified for delivery of the product to a customer, I_3 223 may have a deadline one day prior to an overnight delivery service. In a similar fashion, if it takes one day to get a package to the overnight service and one day to package a product, I_2 222 may have an assigned deadline one day prior to the deadline specified in I_3 223 and I_1 221 may have an assigned deadline one day prior to I_2 222.

During processing associated with a "Calculate Forces on Items" block 262, each item 221-223 has the corresponding forces (see 264, 266 and 268, FIG. 4) calculated (see 274, FIG. 4). Once forces have been calculated, during processing associated with an "Update Items" block 264, each item 221-223 is updated with the values of parameters such as, but not limited to: 1) FPS ID; 2) a target date corresponding to the item; and 3) net force.

During processing associated with a "Calculate Force on Items" block 266, FPS 211 is updated based upon the values stored in each of the corresponding items 221-223. The net resistive force on FPS 211 is then the sum of all the forces corresponding to all the barriers within items 221-223. In this manner, not only can administrator evaluate the progress associated with each goal as represented by FPSs 211-213 but may also evaluate progress associated with individual items, or barriers, associated with each FPS 211-213. Typically, the higher the resistive force calculated for any particular. FPS or item, the more attention is needed to meet both item and FPS deadlines. Finally, control proceeds to an "End Initialize FPS" block 269 during which process 250 is complete.

Figure 6:
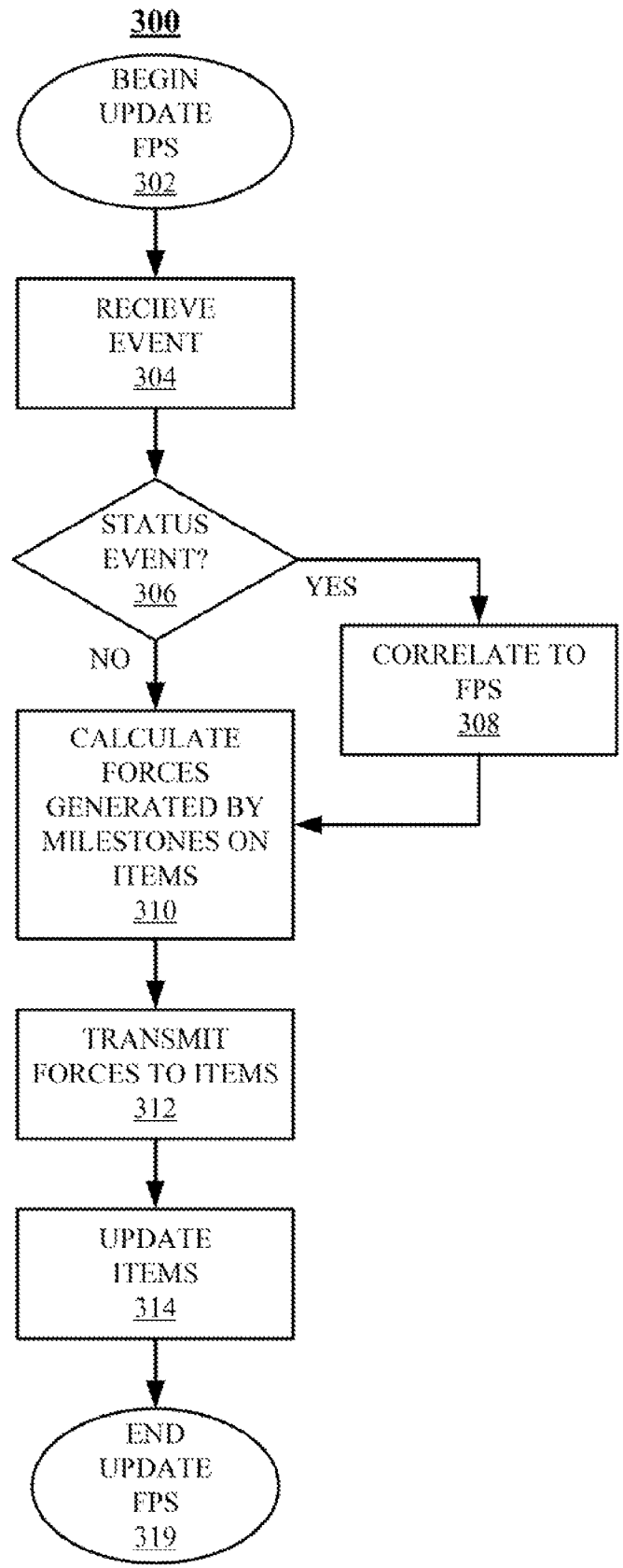
FIG. 6 is a flowchart of an Update FPS process that may implement aspects of the claimed subject matter.

FIG. 6 is a flowchart of an Update FPS process 300 that may implement aspects of the claimed subject matter. In this example, logic associated with process 300 is stored on CRSM 142 (FIG. 1) and executed on one or more processors (not shown) of CPU 134 (FIG. 1) of FBRS server 132 (FIG. 1) in conjunction with FBRS 148 (FIGS. 1 and 3).

Process 300 starts in a "Begin Update FPS" block 302 and proceeds immediately to a "Receive Event" block 304. During processing associated with block 304, FBRS 148 receives an event, which in the following example is either a status event or a timing event. As explained above, a status event typically includes information about each item in a corresponding FPS (see 306) and may include, but is not limited to, factors employed by barriers to determine if milestones corresponding to barriers have been completed, i.e. "completion conditions." Status events may also be employed to report progress of fulfillment paths.

A timing event is by RBRS 148 generated at periodically, user-defined intervals. Since resistive force is a function of time and possibly other independent variables, the resistive forces have to be periodically calculated at times in addition to the receiving of a status event. For example, a particular barrier may have a deadline and, as the deadline approaches, the force on the barrier would increase as time increases.

During processing associated with a "Status Event?" block 306, a determination is made as to whether or not the event received during processing associated with block 304 is a status event, with the alternative being a timing event. If so, control processed to a "Correlate to FPS(s)" block 308. During processing associated with block 308, the status event received during processing associated with block 304 is correlated to a particular FPS, which in the following example is FPS_1 211 (FIG. 1). It should be noted that a particular event may be relevant to more than one FPS but for the sake of simplicity only FPS_1 211 is used in this example.

Once either the event received during processing associated with block 304 has been determined to be a timing event during processing associated with block 306 or a status event has been correlated to a FPS during processing associated with block 308, control proceeds to a "Calculate Forces Generated by Milestones on Barriers" block 310. During processing associated with block 310, the event received during processing associated with block 304 is evaluated with respect to each item, which, when a status event is received are items 221-223, which correspond to FPS_1 211. It should be noted that in the event the event received during processing associated with block 304 is a timing event, all milestones in all FPS(s) 211-213 are reevaluated in light of the timing event. For each item corresponding FPS(s), the resistive forces on the barriers are calculated. During processing associated with a "Transmit Forces to Items" block 312, the forces calculated during processing associated with block 310 are transmitted to each barrier. In other words, each item in the affected FPS(s) receives updates from each other item.

During processing associated with an Update Items" block 314, the net force (see 268, FIG. 4) of each item 221-223 is updated based upon the magnitude of the forces transmitted during processing associated with block 312. Finally, during processing associated with an "End Update FPS" block 319, process 300 is complete.

In this manner, resistive forces on each item and FPS are a function of time and possibly other independent variables. For example, a resistive force may increase as time increases and approaches a deadline. For this reason, resistive forces may also be calculated at periodic user-defined intervals in addition to whenever a status event is received (see 304, FIG. 6). Like in FIG. 6, a periodic update event may be generated by FBRS 148 and transmitted to each barrier. Each barrier would then calculate forces (see 310, FIG. 6), Transmit the calculated forces to each other barrier (see 312, FIG. 6) and update based upon the transmitted forces (see 314, FIG. 6).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An apparatus, comprising:
   a processor,
   a computer-readable storage medium coupled to the processor; and
   logic, stored on the computer-readable storage medium and executed on the processor, for:
     defining a fulfillment path solution (FPS) comprising a plurality of items undergoing an operational fulfillment process (OFP);
       wherein the EPS is associated with a plurality of milestones to be fulfilled by the plurality of items as the items travel the OFP; and
       wherein each milestone of the plurality of milestones exerts a resistive force on each item of the plurality of items;
     calculating a plurality of sums, each sum corresponding to a particular item and each sum as total of all resistive forces exerted on the corresponding item by each of the milestones; the calculating of each resistive force, comprising:
       setting an initial resistive force, with respect to each item, based upon a difference between a deadline associated with the milestone and the item, wherein an item with a deadline closer to the current time is set to a higher resistive force than an item with a deadline farther from the current time; and
       increasing, each resistive force on each item as a corresponding deadline approaches each item;
       wherein a higher sum corresponding to a first item and a lower sum corresponding to a second item indicates a need for more immediate attention to the first item than the second item; and
     transmitting a notification event based upon the plurality of sums and corresponding items to indicate which items require more immediate attention.

2. The apparatus of claim 1, the logic further comprising logic for periodically updating the resistive forces and the plurality of sums.

3. The apparatus of claim 1, the logic further comprising logic for setting each resistive force on each particular item associated with a particular milestone to a value of zero when a corresponding milestone is fulfilled for the particular item.

4. The apparatus of claim 1, the logic for calculating of each resistive force further comprising logic for:
   setting each resistive force to an initial value based upon a corresponding capacity in addition to the corresponding deadline;
   increasing a resistive force in response to an increase in a corresponding capacity; and
   decreasing a resistive force in response to a decrease in a corresponding capacity.

5. The apparatus of claim 1, the logic further comprising logic for calculating a total resistive force corresponding to the OFP, comprising summing the plurality of sums.

6. The apparatus of claim 1, the logic further comprising logic for ordering the items corresponding to the notification event based upon the magnitude of the corresponding sums.

7. A computer programming product, comprising:
   a non-transitory computer-readable storage medium; and
   logic, stored on the computer-readable storage medium for execution on a processor, for:
     defining a fulfillment path solution (FPS) comprising a plurality of items undergoing an operational fulfillment process (OFP);
       wherein the FPS is associated with a plurality of milestones to be fulfilled by the plurality of items as the items travel the OFP; and
       wherein each milestone of the plurality of milestones exerts a resistive force on each item of the plurality of items;
     calculating a plurality of sums, each sum corresponding to a particular item and each sum a total of all resistive forces exerted on the corresponding item by each of the milestones; the calculating of each resistive force, comprising:
       setting an initial resistive force, with respect to each item, based upon a difference between a deadline associated with the milestone and the item, wherein an item with a deadline closer to the current time is set to a higher resistive force than an item with a deadline further from the current time; and
       increasing each resistive force on each item as a corresponding deadline approaches each item;
       wherein a higher sum corresponding to a first item and a lower sum corresponding to a second item indicates a need for more immediate attention to the first item than the second item; and
     transmitting a notification event based upon the plurality of sums and corresponding items to indicate which items quire more immediate attention.

8. The computer programming product of claim 7, the logic further comprising logic periodically updating the resistive forces and the plurality of sums.

9. The computer programming product of claim 7, the logic further comprising logic for setting each resistive force on each particular item associated with a particular milestone to a value of zero when a corresponding milestone is fulfilled for the particular item.

10. The computer programming product of claim 7, the logic for calculating of each resistive force further comprising logic for:
 setting each resistive force to an initial value based upon corresponding capacity in addition to the corresponding deadline;
 increasing a resistive force in response to an increase in a corresponding capacity; and
 decreasing a resistive force in response to a decrease in a corresponding capacity.

11. The computer programming product of claim 7, the logic further comprising logic for calculating a total resistive force corresponding to the OFP, comprising summing the plurality of sums.

12. The computer programming product of claim 7, the logic further comprising logic for ordering the items corresponding to the notification event based upon the magnitude of the corresponding sums.

13. An operational process server, comprising:
 a processor,
 a computer-readable storage medium coupled to the processor; and
 logic, stored on the computer-readable storage medium and executed on the processor, for:
  defining a fulfillment path solution (FPS) comprising a plurality of items undergoing an operational fulfillment process (OFP);
   wherein the FPS is associated with a plurality of milestones to be fulfilled by the plurality of items as the items travel the OFP; and
   wherein each milestone of the plurality of milestones exerts a resistive force on each item of the plurality of items;
  calculating a plurality of sums, each sum corresponding to a particular item and each sum a total of all resistive forces exerted on the corresponding item by each of the milestones; the calculating of each resistive force, comprising:
   setting an initial resistive force, with respect to each item, based upon a difference between a deadline associated with the milestone and the item, wherein an item with a deadline closer to the current time is set to a higher resistive three than an item with a deadline farther from the current time; and
   increasing each resistive force on each item as a corresponding deadline approaches each item;
  wherein a higher sum corresponding to a first item and a lower sum corresponding to a second item indicates a need for more immediate attention to the first item than the second item; and
  transmitting a notification event based upon the plurality of sums and corresponding items to indicate which items require more immediate attention.

14. The operational process server of claim 13, the logic further comprising logic for periodically updating the resistive forces and the plurality of sums.

15. The operational process server of claim 13, the logic further comprising logic for setting each resistive force on each particular item associated with a particular milestone to a value of zero when a corresponding milestone is fulfilled for the particular item.

16. The operational process server of claim 13; the logic for calculating of each resistive force further comprising logic for:
 setting each resistive force to an initial value based upon a corresponding capacity in addition to the corresponding deadline;
 increasing a resistive force in response to an increase in a corresponding capacity; and
 decreasing a resistive force in response to a decrease in a corresponding capacity.

17. The operational process server of claim 13, the logic further comprising logic for calculating a total resistive force corresponding to the OFP, comprising summing the plurality of sums.

18. The operational process server of claim 13, the logic further comprising logic for ordering the items corresponding to the notification event based upon the magnitude of the corresponding sums.

* * * * *